United States Patent [19]

Neuman

[11] Patent Number: 5,744,215
[45] Date of Patent: Apr. 28, 1998

[54] REDUCTION OF HAZE IN TRANSPARENT COATINGS

[75] Inventor: George A. Neuman, Pittsburgh, Pa.

[73] Assignee: PPG Industries, Inc., Pittsburgh, Pa.

[21] Appl. No.: 582,795

[22] Filed: Jan. 4, 1996

[51] Int. Cl.$^6$ ............................................. B32B 3/26
[52] U.S. Cl. .................. 428/141; 428/156; 428/172;
428/432; 428/702; 428/701; 428/913; 428/161;
428/173; 427/126.3; 427/109; 427/167;
427/166; 427/255.3
[58] Field of Search ................................. 428/156, 141,
428/172, 432, 702, 701, 913, 161, 173;
427/126.3, 109, 167, 166, 255.3

[56] References Cited

U.S. PATENT DOCUMENTS

| | | | |
|---|---|---|---|
| 3,378,396 | 4/1968 | Zaromb | 428/428 |
| 3,677,814 | 7/1972 | Gillery | 427/108 |
| 3,759,743 | 9/1973 | Menke | 427/743 |
| 4,187,336 | 2/1980 | Gordon | 428/34 |
| 4,206,252 | 6/1980 | Gordon | 427/160 |
| 4,308,316 | 12/1981 | Gordon | 428/336 |
| 4,329,379 | 5/1982 | Terneu et al. | 427/166 |
| 4,377,613 | 3/1983 | Gordon | 428/212 |
| 4,378,409 | 3/1983 | Wahlers et al. | 428/432 |
| 4,381,333 | 4/1983 | Beggs et al. | 428/312.6 |
| 4,386,117 | 5/1983 | Gordon | 427/109 |
| 4,419,386 | 12/1983 | Gordon | 427/109 |
| 4,421,580 | 12/1983 | Dembicki et al. | 156/69 |
| 4,440,822 | 4/1984 | Gordon | 428/216 |
| 4,547,400 | 10/1985 | Middleton et al. | 427/106 |
| 4,600,654 | 7/1986 | Lindner | 428/432 |
| 4,775,203 | 10/1988 | Vakil et al. | 350/1.7 |
| 4,853,257 | 8/1989 | Henery | 427/166 |
| 4,857,361 | 8/1989 | Bloss et al. | 427/109 |
| 4,904,526 | 2/1990 | Koskenmaki | 428/328 |
| 4,965,093 | 10/1990 | Neuman et al. | 427/109 |
| 5,356,718 | 10/1994 | Athey et al. | 428/428 |
| 5,393,563 | 2/1995 | Ellis, Jr. | 427/248.1 |
| 5,395,698 | 3/1995 | Neuman et al. | 428/428 |
| 5,464,657 | 11/1995 | Athey et al. | 427/255.5 |
| 5,487,784 | 1/1996 | Ellis, Jr. | 118/718 |
| 5,638,479 | 6/1997 | Takami et al. | 385/124 |

FOREIGN PATENT DOCUMENTS

WO 92/17412  10/1992  WIPO.
WO92/17412  10/1992  WIPO.

OTHER PUBLICATIONS

Communication from EPO dated Apr. 10, 1997.
Derwent Publications, Ltd., London, G. B., Abstract, JP 01 028376 A (Nippon Sheet Glass KK), 30 Jan. 1989.
Derwent Publications, Ltd., London, G. B., Abstract, JP 03 232744 A (Nippon Sheet Glass KK), 16 Oct. 1991.
Derwent Publications, Ltd., London, G. B., Abstract, JP 62191447 A (Stanley Elec. KK), Aug. 1987.
Derwent Publications, Ltd., London, G. B., Abstract JP 58069743 A (Toyota Motor KK), Apr. 1983.
Bryant, W. A., "The Fundamentals of Chemical Vapour Deposition", *Journal of Materials Science 12*, (1977), pp. 1285–1306.
Van Den Brekel, C. H. J., "Characterization of Chemical Vapour–Deposition Processes, Part I", *Philips Res. Repts. 32*, (1977), pp. 118–133.
Van Den Brekel, C. H. J. et al., "Characterization of Chemical Vapour–Deposition Processes, Part II", *Philips Res. Repts. 32*, (1977), pp. 134–146.
Bunshah, R. F. et al., "The Activated Reactive Evaporation Process", *1987 Academic Press, Inc.*, pp. 211–245; reprinted by permission of the publisher from *Physics of Thin Films*, M. H. Francombe, J. L. Vossen, eds., pp. 60–107 (1987).

Primary Examiner—William Watkins
Attorney, Agent, or Firm—Donald C. Lepiane

[57] ABSTRACT

Surface haze resulting from a rough surface of a substrate e.g. a fluorine doped tin oxide coated glass piece is reduced by coating the rough surface with a smooth surface coating of sufficient thickness to smooth out the rough surface e.g. coating the tin oxide layer with a silica film having a thickness of about 100 to 2000 Angstroms.

21 Claims, 3 Drawing Sheets

5,744,215

REDUCTION OF HAZE IN TRANSPARENT COATINGS

BACKGROUND

1. Field of the Invention

The present invention relates to a method of minimizing or eliminating surface haze resulting from a rough surface and the article made thereby, and more particularly to a glass substrate having a solar control coating that has minimal if any surface haze and method of making same.

2. Discussion of the Available Technology and Technical Problem

The presently available coating techniques may result in coatings that have surface haze. For example, the application of a solar control coating to a glass substrate may include a low emissivity tin oxide coating deposited on a surface of a glass substrate while supported on a molten metal bath in a non-oxidizing atmosphere. U.S. Pat. Nos. 3,677,814; 3,759,743 and 4,857,361 in general disclose that the haze results from pits or holes in the coating originating from sodium chloride formation. The U.S. patents disclose various methods to minimize or eliminate such haze including eliminating the chlorine from the precursor which minimizes or eliminates the formation of the sodium chloride.

U.S. Pat. Nos. 4,329,379; 4,187,336; 4,547,400 and 4,600,654 in general also disclose that the pits or holes are a result of sodium chloride formation and disclose depositing a barrier coating onto the glass surface before depositing the tin oxide coating. The barrier coating blocks sodium migration from the glass into the coating preventing the formation of sodium chloride thereby reducing the haze originating from pits and holes. Further, U.S. Pat. Nos. 4,329,379 and 4,600,654 in general disclose that haze results from surface irregularities and disclose methods of altering the surface of the tin oxide coating. The coating is altered by the application of a primer layer underneath the tin oxide coating that produces preferred orientation in the tin oxide coating to reduce the surface irregularities or roughness in the coating to minimize if not eliminate surface haze.

WO 92/17412 teaches a technique to eliminate haze by coating the rough surface with a thin layer of transparent glass having a refractive index nearly matching that of the rough surface. The thin layer of glass is heated to flow the glass to form a smooth surface over the coating. Although the technique disclosed in Wo 92/17412 provides a smooth surface, there are drawbacks. More particularly, heating a substrate to a temperature to melt the layer of glass may result in damage to the coating and/or the substrate especially if the substrate is plastic.

The presently available techniques to minimize or eliminate haze have limitations in addition to those discussed above. More particularly, the technique of reducing haze by eliminating chlorine from the precursor minimizes the available precursors for use in coating, and the technique of reducing haze by providing a barrier surface only addresses pits and holes within the coating but not coating surface irregularities.

As can be appreciated, it would be advantageous to provide a technique to reduce or eliminate haze caused by pits or holes and/or surface irregularities that do not have the drawback or limitations of the presently available techniques.

SUMMARY OF THE INVENTION

This invention relates to an article that has minimal if any surface haze when the article is viewed with the eye. The article includes a substrate having a major surface, the major surface having a level of surface haze. In one embodiment of the invention, the substrate is a glass piece having a tin oxide coating layer; the tin oxide layer being the major surface of the substrate. The coating layer has an average peak to valleys distance equal to about 5 to 25 percent of the coating thickness that results in surface haze when the coated glass piece is viewed. The invention contemplates a coating film over the major surface of the substrate; the coating film has a surface that is smoother than the major surface of the substrate. More particularly, the height and depth of the valleys and peaks of the coating film are less than the height and depth of the valleys and peaks of the major surface of the substrate. In one embodiment of the invention a silica coating film having a thickness of 100 to 2000 Angstroms is deposited over the tin oxide coating layer to provide the article that has minimal surface haze.

This invention also relates to a method of reducing surface haze of an article e.g. an article of the type discussed above.

DESCRIPTION OF PREFERRED EMBODIMENTS

In the following discussion, the invention will be discussed with pyrolytic low emissivity coatings; however, as will be appreciated, the invention may be practiced to minimize if not eliminate surface haze of coatings applied in any manner e.g. sputtered coatings, flowed coatings, sprayed coatings, to name a few. Further, the coating on a substrate may be a low emissivity coating e.g. having an emissivity less than 0.5 or any other type of coating. Still further, the substrate may be opaque e.g. made of metal or transparent e.g. made of glass, colored glass or plastic, to name a few materials. Still further, the invention may be practiced to eliminate surface haze of a reflective surface of an uncoated substrate e.g. a substrate made of glass, metal or plastic to name a few materials.

An article having surface haze in the practice of the invention has a rough outer surface on an atomic scale, e.g. valleys, voids, and peaks which results in rough surface extending into the coating or into the surface of an uncoated article. More particularly, the deeper the voids or valleys and the higher the peaks of the coating or article surface, the more intense the haze and vice versa. In a pyrolytically applied tin oxide low emissivity coating film or layer, void or valleys having a depth about 5 to about 25 percent of the total thickness of the coating is expected to produce noticeable surface haze. Light beams passing through and/or reflected from a rough surface of the coating and/or article scatters the light beam resulting in surface haze. The term surface haze or haze is used because the image being observed is often blurred or "hazy"; however, the term "hazy" as used herein also includes loss of light intensity due to the scattering of the reflected and/or transmitted light beams. This concept is discussed below in more detail. Haze is undesirable in many applications where visual clarity is required such as window glazing and optical applications where light loss must be kept to a minimum.

The reflection and/or transmission of light for ease of discussion is broken down into two types: specular and diffuse. In specular reflection, the angle of the reflected light beam is equal to the angle of the incident beam. In diffuse reflectance the angle of the reflected beam is different from the angle of the incident beam. Thus specular reflectance is usually seen in a smooth reflective coating or an opaque substrate such as metal having a smooth surface. In specular transmission, the light transmitted follow Snell's law; in diffused transmission, the light transmitted does not follow Snell's law.

Figure 1:
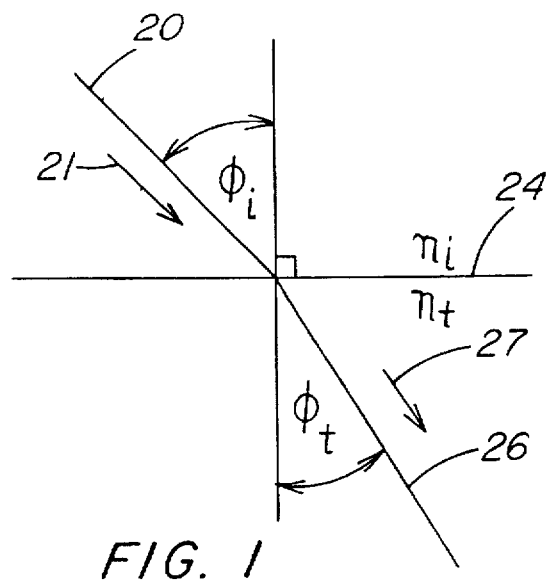
FIG. 1 is a diagram of a light beam illustrating Snell's law at an interface.

The following discussion and reference to the Figures as indicated further develops the above discussion. With reference to FIG. 1, light beam 20 moving in the direction shown by the arrowed line 21 is incident at 22 on interface 24, passes through the interface 24 and exits as transmitted beam 26 moving in the direction shown by the arrowed line 27. Equation 1 below is Snell's law.

$$\text{Sin } \phi_i \times n_i = \text{Sin } \phi_r \times n_r \qquad \text{Eq. 1}$$

where:

$\phi_i$ shown in FIG. 1 is the incident angle of the light beam 20 measured from the normal to the interface 24, $n_i$ shown in FIG. 1 is the refractive index of the medium in which the beam 20 is traveling immediately prior to impinging the interface 24 at 22, $\phi_r$ shown in FIG. 1 is the angle of the transmitted beam 26 as it exits the interface 24 measured from the normal to the interface 24, and $n_r$ shown in FIG. 1 is the refractive index of the medium in which the transmitted beam 26 is traveling immediately after exiting the interface 24.

Figure 2:
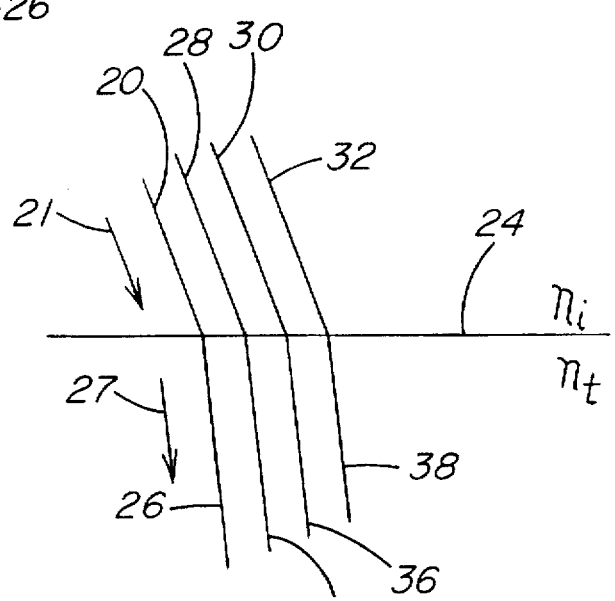
FIG. 2 is a diagram of light beams illustrating the parallel nature of light beams passing through and/or reflected from an interface that is smooth.

With reference to FIG. 2, the beam 20 and beams 28, 30 and 32 are parallel to one another and pass through interface 24 which is smooth. The transmitted beam 26 and the transmitted beams 34, 36 and 38 moving away from the interface 24 in the direction of the arrowed line 27 are parallel to one another in the medium through which they pass and the image viewed is clear, in other words not distorted, not hazy. Further, the reflected beams 27, 29, 31 and 33 traveling in the direction of the arrowed line 35 are parallel resulting in a clear reflected image.

As can be appreciated by those skilled in the art, parallel light beams are realized when the light is collimated; however, when the light is not collimated, the light beams are not parallel to one another. For ease of discussion, the plurality of light beams are considered parallel to one another; however it is understood that the discussion includes non-parallel light beams since the non-parallel beams maintain the spatial relationship when being reflected from or passing through a specular surface.

Figure 3:
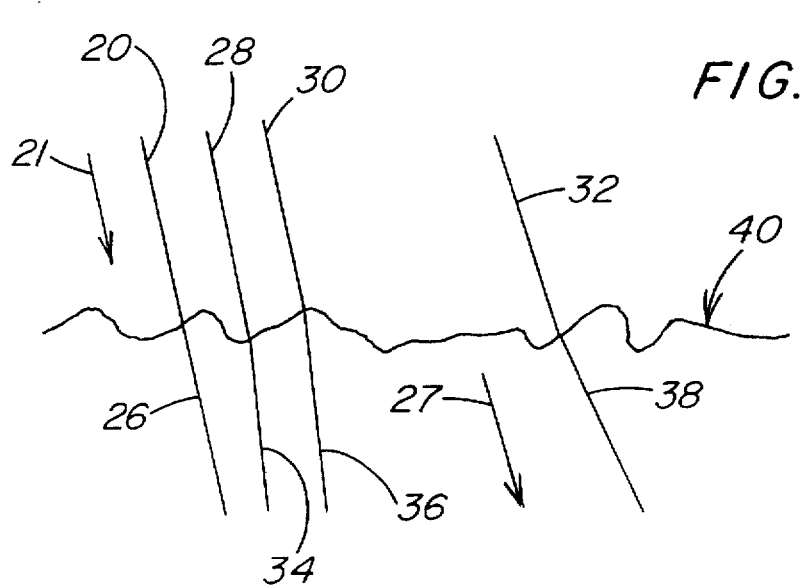
FIG. 3 is a diagram of light beams illustrating the divergent nature of light beams passing through and/or reflected from an interface that is rough.

With reference to FIG. 3, the beams 20, 28, 30 and 32 are shown incident on interface 40 which is rough i.e. not smooth. The transmitted beams 26, 34, 36 and 38 moving in the direction of the arrowed line 27 are not parallel to one another and in this instance the image viewed is distorted e.g. hazy. Further, the reflected beams 27, 29, 31 and 33 are not parallel resulting in a hazy reflected image.

Figure 4:
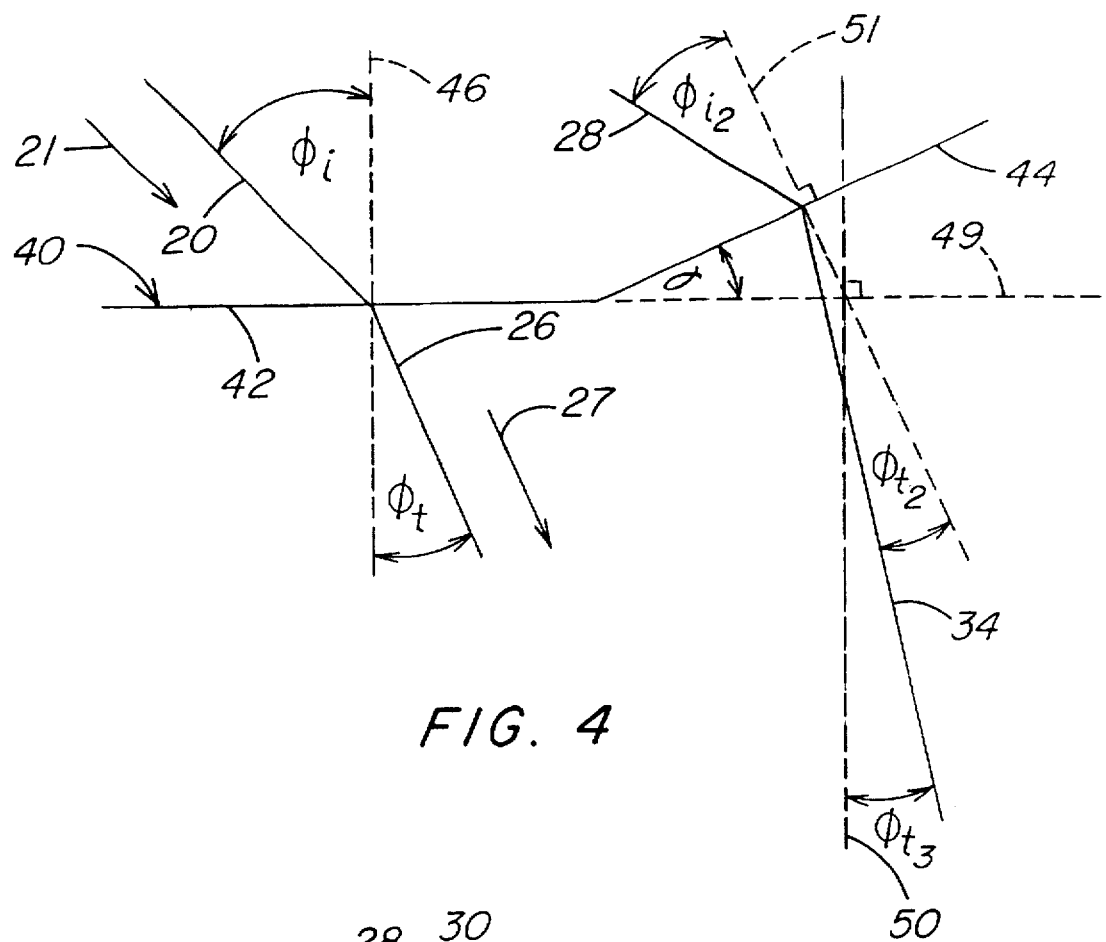
FIG. 4 is a diagram of light beams illustrating Snell's law at an interface that is rough.

With reference to FIG. 4, the beam 20 passes through portions 42 of the interface 40 as the transmitted beam 26 and the beam 28 passes through portion 44 of the interface 40 as the transmitted beam 34. The portions 42 and 44 of the interface 40 are offset by the angle a. Angle $\phi_i$ subtended by the beam 20 and line 46 normal to the interface portion 42 is equal to angle $\phi_{i2}$ subtended by the beam 28 and line 48 normal to the interface portion 44 plus the angle $\alpha$. In FIG. 4, the beams 20 and 28 are parallel to one another and the transmitted beams 26 and 34 are not parallel to one another due to the rough interface 40. It should be realized, however, when the medium through which the beams 20 and 28 pass has the same refractive index as the medium through which the transmitted beams 26 and 34 pass and the beams 20 and 28 are parallel, the transmitted beams 26 and 34 are parallel to one another even though the portions 42 and 44 of the interface 40 are offset from one another by the angle $\alpha$ i.e. the interface 40 is rough.

As can now be appreciated and with continued reference to FIG. 4, when the beams 20 and 28 are parallel to one another and pass through a medium having the same index of refraction, and the transmitted beams 26 and 34 pass through a medium having a different index of refraction than the medium through which the beams 20 and 28 pass, the transmitted beams 26 and 34 are not parallel to one another causing surface haze. The divergence angle from parallel of the transmitted beams 26 and 34 may be determined by extending the portion 42 as shown by the dotted line 49 such that the dotted line 49 and portion 42 of the interface 40 lies in the same plane and either overlap one another or are parallel to one another. A dotted line 50 is drawn normal to the dotted line 49. The angle between the dotted line 50 and the transmitted beam 34 subtends an angle $\phi_{r3}$. The divergence angle from parallel of the transmitted beam 34 is the angle $\phi_{r3}-\phi_r$. As can be appreciated, the discussion of FIG. 4 considered only beams 20 and 28 and transmitted beams 26 and 34 for ease of discussion; however, the discussion is not limited to the number of beams and/or transmitted beams.

The average divergence angle from parallel (hereinafter also referred to as "DA") for transmitted beams passing through a medium $n_r$ having incident parallel beams passing through medium $n_i$ may be determined from the following relationship: DA is equal to $\{ASIN [SIN (\phi_i-\alpha_a)n_i/n_r]+\alpha_a\}-ASIN [SIN (\phi_i)n_i/n_r]$.

The designation "$\alpha_a$" in the above relationship is the average facet angle which is the offset between portions 42 and 44 of the interface 40 through which the beams pass (see FIG. 4). If the average facet angle is zero, i.e., a smooth surface, there would be zero offset. As the average facet angle ($\alpha_a$) increases, the average divergence angle (DA) from parallel increases. From the foregoing, it can now be appreciated by those skilled in the art that eliminating surface roughness eliminates surface haze. In many applications, such as polycrystalline materials, a rough surface is intrinsic. The average divergence angle (DA) from parallel (hereinafter also referred to as deflection) is also related to the refractive indices. If the difference between the refractive indices is reduced then the deflection will also be reduced with no deflection realized when $n_i=n_r$.

In double glazed window applications, the incident medium ($n_i$) is usually a gas e.g. ambient air or argon, nitrogen or oxygen between glass sheets of the glazing unit. Since it is not practical to change the incident medium to appreciably abate haze and clearly not practical when the medium is ambient air, the instant invention contemplates depositing a film between the incident medium and the rough surface. In the practice of the invention the film preferably has a refractive index closer to the refractive index of the rough surface, to reduce the deflection thereby reducing the surface haze. As previously mentioned, the rough surface may be a surface of a substrate or the surface of a layer applied to a substrate e.g. a glass piece.

Preferably the film of the instant invention does not have a rough surface; however, a film having a roughness less than that of the underlying surface i.e. a film having valleys and peaks that have a depth and height less than the depth and height of the valleys and peaks of the underlying surface is acceptable in the practice of the invention to reduce surface haze.

Figure 5:
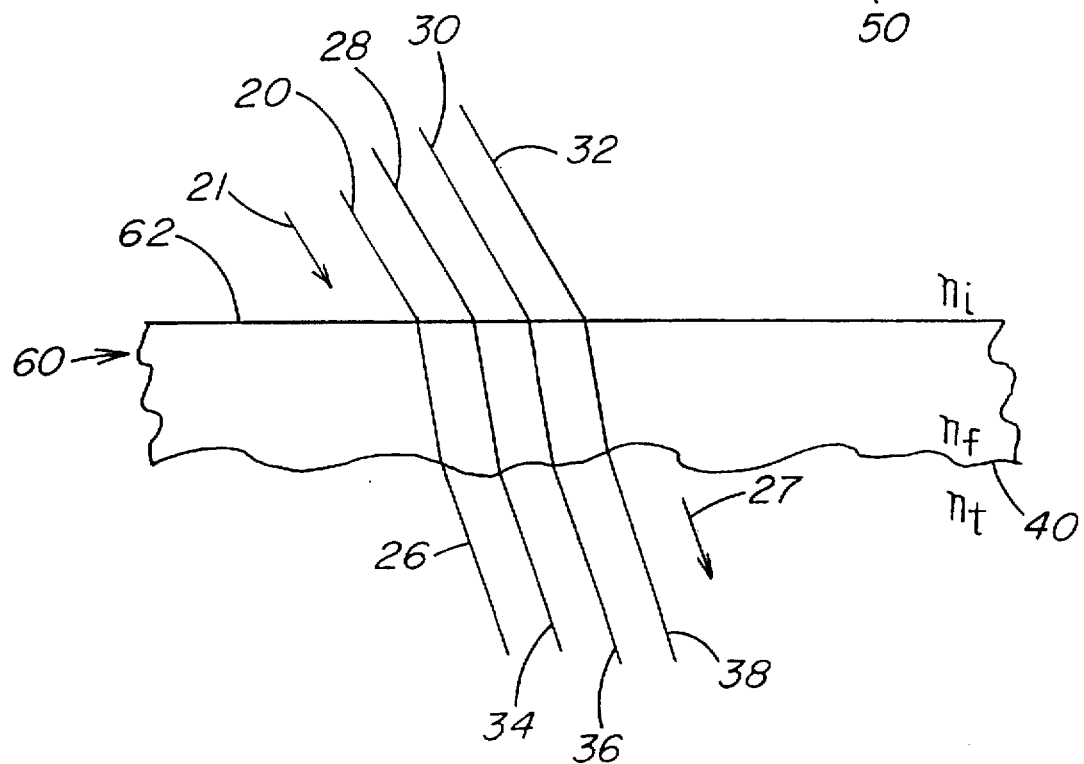
FIG. 5 is a diagram of light beams illustrating an embodiment of the invention to eliminate the divergent nature of the light beams shown in FIG. 3.

Referring to FIG. 5 there is shown a film 60 having an index of refraction $n_f$ incorporating features of the invention on the interface 40 to reduce surface haze. Preferably the film 60 is amorphous to avoid patterning the original roughness of the interface 40 or amplifying it. The film 60 in the practice of the invention may be crystalline, polycrystalline or amorphous so long as the resultant top surface 62 has less roughness than the interface 40.

With the application of the film 60 over the interface 40, $n_i$ is replaced by $n_f$ in the above discussion regarding deflection angle (DA) to determine deflection. In the instance where $n_f=n_t$, the deflection is zero, and there is minimal if any surface haze. When $n_f$ is not equal to $n_t$, the deflection may be determined using the above relationship regarding deflection angle (DA).

Figure 6:
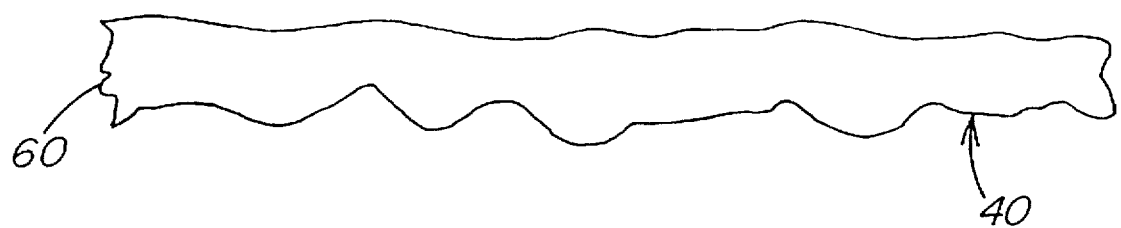
FIG. 6 illustrates partial smoothing of a rough surface in accordance to the disclosure of the invention.
Figure 7:
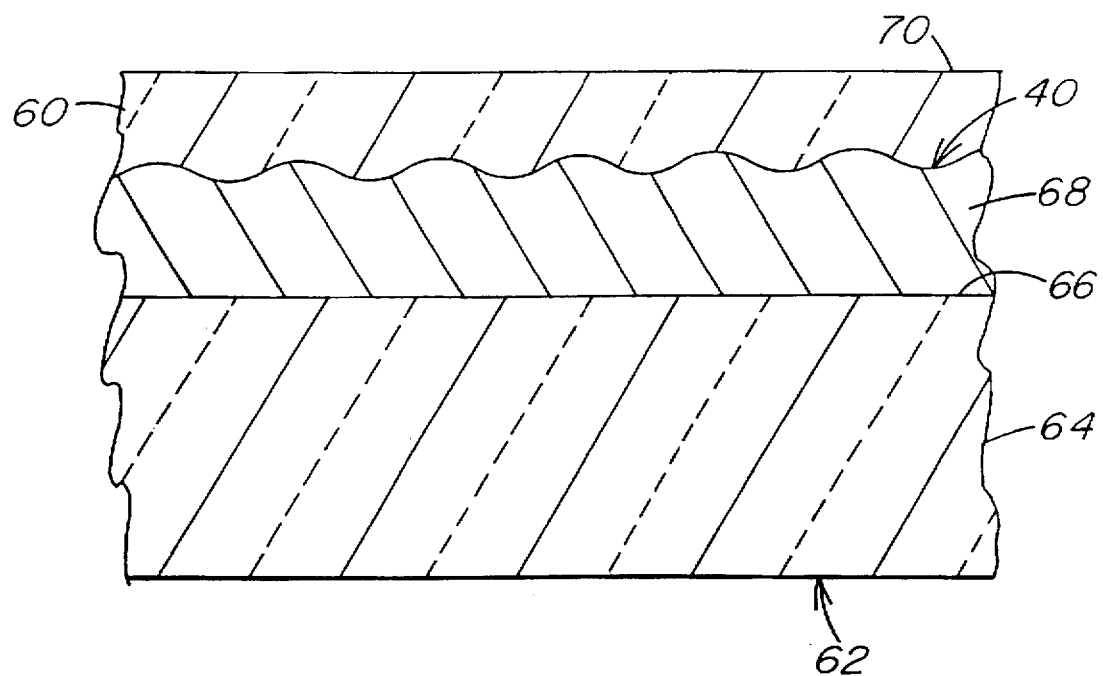
FIG. 7 is a partial cross sectional view of an article made in accordance to the disclosure of the invention to minimize if not eliminate surface haze.

The thickness of the surface haze reduction film 60 is preferably, although not limiting to the invention, sufficient to fill the valleys in the rough surface and additional thickness to completely cover the rough surface. Although not limiting to the invention, a minimum surface haze reducing film thickness is the thickness required to fill the voids or valleys of the rough surface. As can be appreciated in some instances, the minimum thickness would be insufficient to fully eliminate the surface roughness. With reference to FIG. 6, the sharp angular features at the peaks and valleys of the rough surface of the interface 40 are initially rounded by the surface haze reducing film 60, and the surface roughness is less than the original surface roughness. As the thickness of the haze reducing film 60 increases, the roughness is eliminated as shown in FIG. 7. In FIG. 7, there is shown a cross section of an article 62 made in accordance to the disclosure of the instant invention. The article 62 includes a glass piece 64 having applied to its surface 66 a layer 68 e.g. a pyrolytically applied tin oxide film. The layer 68 has the interface 40. Applied to the interface 40 is the surface haze reducing film 60 having sufficient thickness to smooth the rough surface of the interface 40 or surface of the layer 68.

In the practice of the invention, the preferred thickness to eliminate the roughness is dependent on the materials selected for the haze reducing film 60 and the deposition method. For example, if the haze reducing film 60 follows the pattern of the rough surface i.e. the rough surface of the layer 68, minimal haze reduction is realized. If the haze reducing film slowly smoothes the rough surface i.e. surface of the layer 68, a thicker film 60 is preferred. In those instances where the substrate is moving e.g. a float glass ribbon, it is most preferred that the film 60 rapidly smoothes the surface of the layer 68. It is believed that adequate surface haze reduction usually occurs when the haze reducing film 60 has a thickness of 1 to 3 times the average difference between the peaks and the valleys of the rough surface e.g. surface of the layer 60 and complete haze reduction usually occurs when the haze reducing film 60 has a thickness of 3 to 10 times the difference.

Optimum haze reduction is realized when the refractive index of the haze reducing film 60 matches the refractive index of the layer 68 at the interface 40, and the haze reducing film 60 has a smooth surface at the interface e.g. interface 70 in FIG. 7 with the incident medium. As can be appreciated when the layer 68 has a graded index e.g. a combination of two or more oxides, the refractive index of the layer 68 at the interface 40 may be different from the average refractive index at layer 68. Adequate haze reduction occurs even when the index of refraction of the haze reducing film is significantly different than the index of refraction of the material having the rough surface. For example, the index of refraction difference between silica (index of refraction of about 1.45) and tin oxide (index of refraction of about 2.0) is about 0.55. From the above relationship for deflection angle (DA), the deflection is reduced by about 44% when the haze reducing film is silica and the rough surface is tin oxide surface. In other words and with reference to the relationship for the average deflection angle (DA), keeping all variables constant except the index of refraction, the deflection angle for tin oxide in a medium of air is about 10 and keeping all variables constant except the index of refraction, the deflection angle for a tin oxide layer having a silicon film thereover is 5.6. The reduction in surface haze is about 44% ((10−5.6)/10=0.44). The surface haze reduction is also affected by the angle of incident of the light beams 20, 28, 30 and 32. With reference to Table 1, there is listed from left to right on the table is viewed, the angle of incidence of the light beam (shown as Angle of Incidence); the refractive index of the haze reduction film (shown as $n_f$) ; the index of refraction at the major surface of the substrate (shown as $n_t$); the average facet angle of the major surface of the substrate (shown as DA); deflection angle (DA) of the light beam incident on the haze reducing film over the rough interface (shown as $A_f$); the deflection angle (DA) of light beams incident on the rough interface (shown as AR) ; the percent reduction in deflection determined as discussed above (shown as Haze Reduction).

TABLE 1

| Angle of Incidence (in degrees) | $n_f$ | $n_t$ | DA (in degrees) | $A_f$ (in degrees) | $A_R$ (in degrees) | Haze Reduction |
|---|---|---|---|---|---|---|
| 0 | 1.45 | 2 | 20 | 5.64 | 10 | 44% |
| 0 | 1.5 | 2 | 20 | 5.14 | 10 | 49% |
| 0 | 1.55 | 2 | 20 | 4.63 | 10 | 54% |
| 0 | 1.6 | 2 | 20 | 4.12 | 10 | 59% |
| 0 | 1.65 | 2 | 20 | 3.61 | 10 | 64% |
| 0 | 1.7 | 2 | 20 | 3.10 | 10 | 69% |
| 0 | 1.75 | 2 | 20 | 2.59 | 10 | 75% |
| 0 | 1.8 | 2 | 20 | 2.07 | 10 | 80% |
| 0 | 1.85 | 2 | 20 | 1.56 | 10 | 85% |
| 0 | 1.9 | 2 | 20 | 1.04 | 10 | 90% |
| 0 | 1.95 | 2 | 20 | 0.52 | 10 | 95% |
| 0 | 2 | 2 | 20 | 0.00 | 10 | 100% |
| 0 | 2.05 | 2 | 20 | 0.52 | 10 | 95% |
| 0 | 2.1 | 2 | 20 | 1.05 | 10 | 90% |
| 0 | 2.15 | 2 | 20 | 1.57 | 10 | 85% |
| 0 | 2.2 | 2 | 20 | 2.10 | 10 | 79% |
| 0 | 2.25 | 2 | 20 | 2.63 | 10 | 74% |
| 0 | 2.3 | 2 | 20 | 3.16 | 10 | 69% |
| 0 | 2.35 | 2 | 20 | 3.70 | 10 | 64% |
| 0 | 2.4 | 2 | 20 | 4.23 | 10 | 58% |
| 0 | 2.45 | 2 | 20 | 4.77 | 10 | 53% |

TABLE 1-continued

| Angle of Incidence (in degrees) | $n_f$ | $n_r$ | DA (in degrees) | $A_f$ (in degrees) | $A_R$ (in degrees) | Haze Reduction |
|---|---|---|---|---|---|---|
| 0 | 2.5 | 2 | 20 | 5.31 | 10 | 48% |
| 45 | 1.45 | 2 | 20 | 7.00 | 11 | 39% |
| 45 | 1.5 | 2 | 20 | 6.45 | 11 | 44% |
| 45 | 1.55 | 2 | 20 | 5.89 | 11 | 49% |
| 45 | 1.6 | 2 | 20 | 5.31 | 11 | 54% |
| 45 | 1.65 | 2 | 20 | 4.72 | 11 | 59% |
| 45 | 1.7 | 2 | 20 | 4.11 | 11 | 64% |
| 45 | 1.75 | 2 | 20 | 3.48 | 11 | 70% |
| 45 | 1.8 | 2 | 20 | 2.83 | 11 | 75% |
| 45 | 1.85 | 2 | 20 | 2.16 | 11 | 81% |
| 45 | 1.9 | 2 | 20 | 1.47 | 11 | 87% |
| 45 | 1.95 | 2 | 20 | 0.75 | 11 | 93% |
| 45 | 2 | 2 | 20 | 0.00 | 11 | 100% |
| 45 | 2.05 | 2 | 20 | 0.78 | 11 | 93% |
| 45 | 2.1 | 2 | 20 | 1.60 | 11 | 86% |
| 45 | 2.15 | 2 | 20 | 2.46 | 11 | 79% |
| 45 | 2.2 | 2 | 20 | 3.36 | 11 | 71% |
| 45 | 2.25 | 2 | 20 | 4.31 | 11 | 62% |
| 45 | 2.3 | 2 | 20 | 5.33 | 11 | 54% |
| 45 | 2.35 | 2 | 20 | 6.41 | 11 | 44% |
| 45 | 2.4 | 2 | 20 | 7.58 | 11 | 34% |
| 45 | 2.45 | 2 | 20 | 8.84 | 11 | 23% |
| 45 | 2.5 | 2 | 20 | 10.23 | 11 | 11% |
| 0 | 1.45 | 2 | 40 | 12.22 | 21 | 42% |
| 0 | 1.5 | 2 | 40 | 11.18 | 21 | 47% |
| 0 | 1.55 | 2 | 40 | 10.12 | 21 | 52% |
| 0 | 1.6 | 2 | 40 | 9.05 | 21 | 57% |
| 0 | 1.65 | 2 | 40 | 7.97 | 21 | 62% |
| 0 | 1.7 | 2 | 40 | 6.88 | 21 | 68% |
| 0 | 1.75 | 2 | 40 | 5.78 | 21 | 73% |
| 0 | 1.8 | 2 | 40 | 4.65 | 21 | 78% |
| 0 | 1.85 | 2 | 40 | 3.52 | 21 | 83% |
| 0 | 1.9 | 2 | 40 | 2.36 | 21 | 89% |
| 0 | 1.95 | 2 | 40 | 1.19 | 21 | 94% |
| 0 | 2 | 2 | 40 | 0.00 | 21 | 100% |
| 0 | 2.05 | 2 | 40 | 1.21 | 21 | 94% |
| 0 | 2.1 | 2 | 40 | 2.45 | 21 | 88% |
| 0 | 2.15 | 2 | 40 | 3.71 | 21 | 83% |
| 0 | 2.2 | 2 | 40 | 5.00 | 21 | 76% |
| 0 | 2.25 | 2 | 40 | 6.31 | 21 | 70% |
| 0 | 2.3 | 2 | 40 | 7.66 | 21 | 64% |
| 0 | 2.35 | 2 | 40 | 9.05 | 21 | 57% |
| 0 | 2.4 | 2 | 40 | 10.47 | 21 | 51% |
| 0 | 2.45 | 2 | 40 | 11.94 | 21 | 44% |
| 0 | 2.5 | 2 | 40 | 13.46 | 21 | 37% |
| 45 | 1.45 | 2 | 40 | 12.78 | 22 | 41% |
| 45 | 1.5 | 2 | 40 | 11.72 | 22 | 46% |
| 45 | 1.55 | 2 | 40 | 10.64 | 22 | 51% |
| 45 | 1.6 | 2 | 40 | 9.55 | 22 | 56% |
| 45 | 1.65 | 2 | 40 | 8.44 | 22 | 61% |
| 45 | 1.7 | 2 | 40 | 7.30 | 22 | 66% |
| 45 | 1.75 | 2 | 40 | 6.15 | 22 | 72% |
| 45 | 1.8 | 2 | 40 | 4.98 | 22 | 77% |
| 45 | 1.85 | 2 | 40 | 3.77 | 22 | 83% |
| 45 | 1.9 | 2 | 40 | 2.55 | 22 | 88% |
| 45 | 1.95 | 2 | 40 | 1.29 | 22 | 94% |
| 45 | 2 | 2 | 40 | 0.00 | 22 | 100% |
| 45 | 2.05 | 2 | 40 | 1.33 | 22 | 94% |
| 45 | 2.1 | 2 | 40 | 2.69 | 22 | 88% |
| 45 | 2.15 | 2 | 40 | 4.10 | 22 | 81% |
| 45 | 2.2 | 2 | 40 | 5.56 | 22 | 74% |
| 45 | 2.25 | 2 | 40 | 7.08 | 22 | 68% |
| 45 | 2.3 | 2 | 40 | 8.65 | 22 | 60% |
| 45 | 2.35 | 2 | 40 | 10.31 | 22 | 53% |
| 45 | 2.4 | 2 | 40 | 12.05 | 22 | 45% |
| 45 | 2.45 | 2 | 40 | 13.89 | 22 | 36% |
| 45 | 2.5 | 2 | 40 | 15.86 | 22 | 27% |

From Table 1 it can be seen that there is a 100% reduction in surface haze when the refractive index of the haze reducing layer and the layer having the rough surface are the same regardless of the angle of incidence. In other words, when the film index matches the index of the rough surface of the layer, the haze reduction is independent of the angle of incidence. Further the angle of incidence affects the deflection angle ($A_f$) when the index of refraction of the haze reducing film is different from the index of refraction at the rough surface of the layers. For example and with reference to Table 1, when the angle of incidence is zero and the index of refraction of the film and rough surface are 1.45 and 2.0 respectively, the surface haze reduction is 44% and when the angle of incidence is 45° and the index of refraction of the film and rough surface are 1.45 and 2.0 respectively, the surface haze reduction is 39%.

The refractive index of the haze reducing layer may be equal to or different than the refractive index at the rough surface. As shown in the table, surface haze reduction is realized when the index of refraction of the haze reducing film is greater or less than the index of refraction at the surface of the interface.

Further, the reflected light is scattered and a comparable formula may be developed to show the embodiments of the invention for light beams reflected from a rough surface resulting in surface haze and from a haze reducing film of the instant invention to reduce if not eliminate the surface haze.

The formula derived above is a simplistic approach to the phenomena of scattering because it considers light beams as a particle; however, light is not ideally a particle, it also has a wave character. Since the light has a wave character on a scale comparable to the roughness of the surface on which it impinges, it is partially scattered by the roughness. As the degree of roughness increases, the impact on the light wave increases and a larger portion of the light is scattered. In this way, the surfaces with greater degrees of roughness scatter a higher percentage of the incident light.

The haze can be measured with the light beams in the reflectance or the transmittance modes. In the reflectance mode, the total diffuse reflectance of the light beam is measured and the percent diffuse reflectance is a "haze" number. In the transmittance mode, ASTM method D1003-92 is recommended to determine a transmitted "haze" number.

In the following discussion, the invention will be disclosed to minimize if not eliminate surface haze in a tin oxide coating on glass; however, as can be appreciated the invention is not limited thereto and the following is presented only for purposes of illustration.

The nature of the morphology of coatings e.g. the haze reducing film and/or the layer having the rough surface is dependent on a number of different factors such as selection of the substrate (amorphous, polycrystalline or single crystal), nucleation conditions and the choice of deposition parameters. A glass piece is amorphous and generally is not suitable for epitaxial, or single crystal growth. In coating glass, randomly oriented nucleation sites are first formed on the glass surface and the subsequent crystal growth produces a randomly oriented polycrystalline coating. This type of coating often has a rough surface e.g. the formation of the randomly oriented nucleation sites and the subsequent growth of a polycrystalline coating is dependent on many different processing parameters.

A parameter of interest is the substrate temperature, or more precisely the ratio of the substrate temperature to the melting point of the coating, i.e., the zone temperature. R. F. Bunshah and C. Deshpandey, in The Activated Reactive Evaporation Process, Physics of Thin Films, pp. 60–107 (1987) which disclosure is hereby incorporated by reference, discuss the different morphologies resulting from different ranges of the zone temperature described above. When the zone temperature is between approximately 0.3 and 0.8 the coating morphology will be polycrystalline with a columnar grain structure. The zone temperature in the deposition process disclosed in U.S. Pat. No. 4,853,257 which disclosure is hereby incorporated by reference for tin oxide is 0.66, in the center of the polycrystalline region. This temperature is essentially fixed by the physical requirements of depositing the coating in a float bath. By altering the other deposition parameters (see W. A. Bryant, in a review article, The fundamentals of chemical vapor deposition, Journal of Materials Science 12 (1977) 1285– 1306 which disclosure is hereby incorporated by reference), specifically the supersaturation of the reactant species above the growing coating, the morphology can also be altered.

In the process disclosed in U.S. Pat. No. 4,853,257 and in other pyrolytic type coatings, the deposition reaction proceeds very rapidly, and it is difficult to economically increase the supersaturation sufficiently to alter the morphology dominated by the substrate temperature. The net effect of the combination of the deposition parameters is that the coating is polycrystalline and columnar with a rough surface.

From the above discussions, it can now be appreciated by those skilled in the art that the tin oxide film is usually rough and has surface haze.

The selection and formation of the haze reducing film 60 (FIG. 7) does not have the same limitations as the functional coating, i.e. the tin oxide coating providing the low emissivity, and its morphology can more easily be altered for optimum haze reduction. The deposition temperature can be lowered and the supersaturation of the reactant species can be increased as described previously and this will favor the deposition of amorphous coatings. Although these changes can be affected during the deposition of the haze reducing film, they cannot be easily affected during the deposition of the underlying film 68 (FIG. 7) which is the functional film. For example, tin oxide is a functional film having preferred electrical conductivity and low emissivity with the polycrystalline structure. These properties are degraded when the coating is amorphous.

U.S. Pat. No. 5,356,718 which is hereby incorporated by reference discloses applying a mixed metal oxide anti-iridescent amorphous film on a glass substrate followed by applying a functional film of tin oxide. U.S. Pat. No. 5,356,718 discloses oxide precursors used to deposit the mixed metal oxide anti-iridescent film that may be used in the practice of the invention to deposit the haze reducing film. More particularly, the metal oxides disclosed in U.S. Pat. No. 5,356,718 may be used alone or in combination and the resultant film may have a uniform index of refraction throughout its thickness or a varying index of refraction throughout its thickness. Preferably, but not limited to the invention, the index of refraction of the film at the rough surface and the index of refraction of the rough surface should be the same. The precursors disclosed in U.S. Pat. No. 5,356,718 are of interest in the instant invention because of the use of additives to the coating reactants that become incorporated into the resultant coating and have the effect of suppressing crystallization. This is a convenient method for altering the coating morphology when forced to operate the deposition process in a manner that would result in non-optimum coating morphology without the additives.

The application of the haze reducing film can also be practiced using other deposition methods such as, but not limited to, sol gel or vacuum deposition. These low temperature deposition processes often produce amorphous coatings and are therefore ideal in the practice of the instant invention.

Examples of silicon compounds that may be used in the practice of the invention to form the haze reducing film include, but are not limited to, tetraethoxysilane, silane, diethylsilane, di-t-butoxy-di-acetoxysilane, diethyldichlorosilane, tetramethylcyclotetrasiloxane and triethoxysilane and the silicon compounds disclosed in U.S. Pat. Nos. 3,378,396; 4,187,336; 4,308,316; 4,377,613; 4,419,386; 4,206,252; 4,440,822 and 4,386,117, which are incorporated herein by reference. In addition to the silicon-containing precursors discussed above, the invention contemplates silicon-containing precursors that can be converted to their corresponding silicon oxides and can be used in admixture with the metal-containing precursors to form a mixed oxide haze reducing film with an oxide ratio suitable to produce the desired refractive index.

Silicon-containing precursors disclosed in U.S. Pat. No. 5,356,718, column 8, line 31 to column 11, line 48, may be used in the practice of the invention.

A number of materials are identified in U.S. Pat. No. 5,356,718 that can be used to accelerate the deposition rate of silicon oxides from their precursors. Accelerants that can be used in the practice of the invention to increase the deposition rate of silicon oxide alone or in combination with another oxide, for example, tin oxide, can be defined as follows:

(1) Lewis Acids, such as trifluoroacetic acid and hydrochloric acid.

(2) Lewis Bases, such as NaOH, NaF, $CH_3OH$, $CH_3OCH_3$ and $S(CH_3CH_2)_2$.

(3) Water.

(4) Compounds of nitrogen, phosphorus, boron, and sulfur having the following structural formulae:

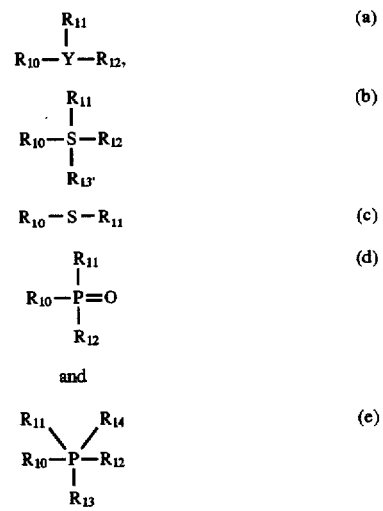

wherein Y is selected from the group consisting of nitrogen, boron and phosphorus and $R_{10}$, $R_{11}$, $R_{12}$, $R_{13}$ and $R_{14}$ are selected from the following list of functional groups, hereinafter referred to as Group F:

hydrogen;

halogens, preferably Cl;

alkenyl or substituted alkenyl radicals having from 2 to 10, preferably 2 to 4, carbon atoms, such as —CH=$CH_2$;

perhalogenated alkyl or substituted alkyl radicals having from 1 to 10, preferably 1 to 4, carbon atoms, such as —$CClH_2$ or halogenated alkyl or substituted alkyl radicals having from 1 to 10, preferably 1 to 4, carbon atoms, such as —$CCl_2CH_2CH_3$;

acyloxy radicals having from 1 to 10, preferably 1 to 4, carbon atoms, such as —OCOCH$_3$;

alkynyl or substituted alkynyl radicals having from 2 to 10, preferably 2 to 4, carbon atoms, such as —CCH;

alkyl or substituted alkyl radicals having from 1 to 10, preferably 1 to 4, carbon atoms, such as —CH$_3$, —CH$_2$CH$_2$CH$_3$;

aryl or substituted aryl radicals having from 6 to 10, preferably 6 to 9, carbon atoms, such as —C$_6$H$_4$CH$_3$;

alkoxide or substituted alkoxide radicals having from 1 to 10, preferably 1 to 4, carbon atoms, such as —OCH$_2$CH$_2$CH$_3$;

wherein said substituents are from Group E discussed above, examples of which compounds include but are not limited to triethylphosphite, trimethylphosphite, trimethylborate, PF$_5$, PCl$_3$, PBr$_3$, PCl$_5$, BCl$_3$, BF$_3$, (CH$_3$)$_2$BBr, SF$_4$ and HO$_3$SF. In the practice of the invention triethylphosphite has been used.

(5) Compounds of aluminum having the following structural formula III may be used to accelerate the deposition rate of silicon-containing precursors alone or in combination with other metal-containing precursors (the "other metal-containing precursors", as can be appreciated, do not include aluminum-containing precursors):

$$R_{17}-Al-R_{16}$$
with $R_{15}$ above Al.

III wherein R$_{15}$, R$_{16}$, and R$_{17}$ are the same or different and are selected from the following Group G:

hydrogen;

halogens, preferably Cl;

—O—R$_{17}$, wherein R$_{17}$ is a linear, branched or substituted alkyl radical having from 1 to 10 carbon atoms, preferably 1 to 4, with substituents selected from Group E discussed above;

—S—R$_{18}$, where R$_{18}$ is equivalent to R$_{17}$ defined above;

—NH$_2$;

R$_{19}$—N—R$_{20}$, wherein R$_{19}$ and R$_{20}$ are linear or branched alkyl groups, or substituted alkyl groups having from 1 to 10, preferably 1 to 4, carbon atoms, with substituents selected from Group E discussed above (less the phosphine groups, such as —PH$_2$); and N R$_{21}$, wherein R$_{21}$ forms cyclic group having from 2 to 10 preferably 2 to 6 carbon atoms, with substituents selected from Group E discussed above (less the phosphine groups).

(6) Ozone.

When the substrate 64 (see FIG. 7), e.g. a glass piece is coated with a layer having a rough surface 40, the haze reducing film may be deposited by chemical vapor deposition of a single oxide or mixed oxides, for example, a mixture of silicon oxide and tin oxide, the subsequently formed article 62 has reduced surface haze.

It has been determined that when chemical vapor deposition of single or mixed oxides is carried out with the addition of one or more of the accelerants, e.g. compounds of phosphorus, aluminum, or boron, a small amount of the foundation atom, e.g. phosphorus, aluminum or boron, is found dispersed in the coating. The presence of phosphorus, aluminum and/or boron in the coating affects the morphology of the resultant coating by decreasing the crystallinity (approaching zero percent crystallinity), thereby reducing the light scattering properties which can be observed as haze. The amount of phosphorus, aluminum or boron incorporated in the layer is a function of process variables.

In the practice of the invention, a glass ribbon moving at speeds between 175 to 730 inches (4.25 to 18 meters) per minute, and having a temperature in the range of 1180 F. (637 C.) to 1220 F. (660 C.) was coated with a gaseous mixture having a phosphorus compound as an accelerant; the mole fraction of the accelerant was 0.01 to 0.5. One to 12 atomic percent of phosphorus was found dispersed in the coating. The invention encompasses using an amount of accelerant greater than 0 and up to 15 atomic percent, with a preferred range of 1 to 5 atomic percent.

The following examples pertain to reducing the scattered light from a coating surface. The coating is a low emissivity coating useful in energy conservative windows. The coating is a fluorine-doped tin oxide having a thickness between about 500 to 10,000 Angstroms, usually between 1,000 to 5,000 Angstroms. When deposited, the tin oxide coating has a low emissivity and is polycrystalline with the average distance between the valleys and peaks equal to about 12 to 15% of its total thickness. The scattered light is very objectionable in residential and commercial applications, and a cost effective method of reducing the scattered light is described.

In the following examples which demonstrate the features of the invention a glass ribbon of the type sold by PPG Industries, Inc. under its trademark Solex was coated on a commercial float line using the coating apparatus and method disclosed in U.S. Pat. No. 4,853,257 which disclosure is hereby incorporated by reference. In each example the fluorine-doped tin oxide coating precursor used was a mixture of about 90 weight % monobutyltin trichloride (MBTC), 5 weight % trifluoroacetic acid (TFA) and 5 weight % methylisobutylketone hereinafter in the examples referred to as the "Mixture". The Mixture was fed at a rate to achieve the MBTC mole percent concentration in the carrier gas stream stated in the examples. Water was also fed in the carrier gas stream to achieve the molar concentration stated in the examples. The carrier gas with the Mixture was delivered to the surface of the glass ribbon at a temperature of about 350° F. (177° C.). The glass ribbon was heated to the temperature stated in the examples to deposit a tin oxide coating having the thickness stated in the examples.

The tin oxide coated glass ribbon in each example was cut into three pieces. One piece was overcoated with a silica film having a thickness of 500 Angstroms (Å); a second piece was overcoated with a silica film having a thickness of 1000 Å. The silica films were deposited by chemical vapor deposition in a laminar cold wall reactor. The deposition temperature for each of the glass pieces was about 1200° F. (649° C.). As the coated glass piece was heated, an air carrier gas was passed over the glass piece in the quartz tube in a laminar fashion at a velocity of about 20 cm/second. Tetraethylorthosilicate (TEOS) (the silica precursor) was fed at a rate necessary to attain a molar concentration in the carrier gas stream of 1.75%. The deposition time for the 500 Å thick silica film was 115 seconds and for the 1000 Å thick silica film was 230 seconds.

The third piece of glass having the tin oxide layer was placed in the quartz tube and heated to the temperature of the other pieces for a period of about 173 seconds (the average heating time of the other two pieces). No TEOS as fed into the reactor during the heating of the third piece. The tin oxide coated glass that was not exposed to TEOS was the control sample and it was heated to determine the effect, if any, on surface haze.

The surface haze was measured on each of the samples using a Spectrogard Spectrophotometer configured as known in the art to measure only non-specular, or diffuse, light reflectance. The diffuse light value was considered the measure of surface haze; the higher the value, the more surface haze and vice versa. The haze values for the samples are shown in Table 2.

The emissivity of each sample was measured after the tin oxide coating was deposited and after the silica overcoat for two samples and after heating for the control sample using an infrared spectrophotometer. The emissivity values for the samples are shown in Table 2.

EXAMPLE I

The glass ribbon speed was about 339 inches (8.6 meters) per minute and the coater was positioned above the ribbon at a height of about 0.197 inches (0.50 centimeter (cm)). Three deposition slots were used and the mixture fed an air carrier gas steam at about 56 cubic feet (1.6 cubic meters) per minute per slot to deposit the tin oxide film on the glass ribbon. The Mixture was fed at a rate to achieve an MBTC concentration of 1.09 mole percent in the carrier gas stream. Water was fed in an amount to achieve a molar concentration in the carrier gas stream of 1.05%. The glass ribbon temperature during deposition of the tin oxide film was about 1254° F. (679° C.). The coating was 1871 Å thick.

EXAMPLE II

The glass ribbon speed was about 339 inches (8.6 meters) per minute and the coater was positioned above the ribbon at a height of about 0.197 inches (0.50 cm). Two deposition slots were used and the mixture fed an air carrier gas steam at about 65 cubic feet (1.84 cubic meters) per minute per slot. The Mixture was fed at a rate to achieve an MBTC concentration of 1.73 mole percent in the carrier gas stream. Water was fed in an amount to achieve a molar concentration in the carrier gas stream of 1.10%. The glass ribbon temperature during deposition of the tin oxide film was about 1254° F. (679° C.). The coating was 1630 Å thick.

EXAMPLE III

The glass ribbon speed was about 357 inches (9.06 meters) per minute and the coater was positioned above the ribbon at a height of about 0.201 inches (0.51 cm). Three deposition slots were used and fed an air carrier gas steam at about 61 cubic feet (1.73 cubic meters) per minute per slot. The Mixture was fed at a rate to achieve an MBTC concentration of 1.24 mole percent in the carrier gas stream. Water was fed in an amount to achieve a molar concentration in the carrier gas stream of 0.3% in the first slot and 0.86% in the second two slots. The glass ribbon temperature during deposition of the tin oxide film was about 1228° F. (664° C.). The coating was 1628 Å thick.

EXAMPLE IV

The glass ribbon speed was about 339 inches (8.6 meters) per minute and the coater was positioned above the ribbon at a height of about 0.197 inches (0.50 cm). Three deposition slots were used and fed an air carrier gas steam at about 60 cubic feet (1.7 cubic meters) per minute per slot. The Mixture was fed at a rate to achieve an MBTC concentration of 1.24 mole percent in the carrier gas stream. Water was fed in an amount to achieve a molar concentration in the carrier gas stream of 0.93%. The glass ribbon temperature during deposition of the tin oxide film was about 1160° F. (627° C.). The coating was 1612 Å thick.

EXAMPLE V

The glass ribbon speed was about 468 inches (11.89 meters) per minute and the coater was positioned above the ribbon at a height of about 0.210 inches (0.53 cm). Three deposition slots were used and fed an air carrier gas steam at about 61 cubic feet (1.73 cubic meters) per minute per slot. The Mixture was fed at a rate to achieve an MBTC concentration of 1.24 mole percent in the carrier gas stream. Water was fed in an amount to achieve a molar concentration in the carrier gas stream of 1.54% in the first slot and 1.84% in the second two slots. The glass ribbon temperature during deposition of the tin oxide film was about 1151° F. (622° C.). The coating was 1615 Å thick.

EXAMPLE VI

The glass ribbon speed was about 468 inches (11.89 meters) per minute and the coater was positioned above the ribbon at a height of about 0.210 inches (0.53 cm). Three deposition slots were used and fed an air carrier gas steam at about 101 cubic feet (2.87 cubic meters) per minute per slot. The Mixture was fed at a rate to achieve an MBTC concentration of 1.24 mole percent in the carrier gas stream. Water was fed in an amount to achieve a molar concentration in the carrier gas stream of 2.17% in the first slot and 2.46% in the second two slots. The glass ribbon temperature during deposition of the tin oxide film was about 1205° F. (652° C.). The coating was 2277 Å thick.

EXAMPLE VII

The glass ribbon speed was about 468 inches (11.89 meters) per minute and the coater was positioned above the ribbon at a height of about 0.322 inches (0.82 cm). Three deposition slots were used and fed an air carrier gas steam at about 81 cubic feet (2.29 cubic meters) per minute per slot. The Mixture was fed at a rate to achieve an MBTC concentration of 1.24 mole percent in the carrier gas stream. Water was fed in an amount to achieve a molar concentration in the carrier gas stream of 1.57% in the first two slots and 0.45% in the third slot. The glass ribbon temperature during deposition of the tin oxide film was about 1250° F. (652° C.). The coating was 1858 Å thick.

EXAMPLE VIII

The glass ribbon speed was about 468 inches (11.89 meters) per minute and the coater was positioned above the ribbon at a height of about 0.228 inches (0.58 cm). Three deposition slots were used and fed an air carrier gas steam at about 81 cubic feet (2.29 cubic meters) per minute per slot. The Mixture was fed at a rate to achieve an MBTC concentration of 1.24 mole percent in the carrier gas stream. Water was fed in an amount to achieve a molar concentration in the carrier gas stream of 1.23%. The glass ribbon temperature during deposition of the tin oxide film was about 1288° F. (698° C.). The coating was 2345 Å thick.

EXAMPLE IX

The glass ribbon speed was about 468 inches (11.89 meters) per minute and the coater was positioned above the ribbon at a height of about 0.341 inches (0.87 cm). Three deposition slots were used and fed an air carrier gas steam at about 81 cubic feet (2.29 cubic meters) per minute per slot. The Mixture was fed at a rate to achieve an MBTC concentration of 1.24 mole percent in the carrier gas stream. Water was fed in an amount to achieve a molar concentration in the carrier gas stream of 0.98%. The glass ribbon temperature during the deposition of tin oxide was about 1222° F. (661° C.). The coating was 1926 Å thick.

EXAMPLE X

The glass ribbon speed was about 468 inches (11.89 meters) per minute and the coater was positioned above the ribbon at a height of about 0.175 inches (0.44 cm). Three deposition slots were used and fed an air carrier gas steam at about 81 cubic feet (2.29 cubic meters) per minute per slot. The Mixture was fed at a rate to achieve an MBTC concentration of 0.99 mole percent in the carrier gas stream. Water was fed in an amount to achieve a molar concentration in the carrier gas stream of 1.18%. The glass ribbon temperature during the deposition of the tin oxide film was about 1234° F. (668° C.). The coating is 1986 Å thick.

TABLE 2

|  | Haze Reading in Percent | Emissivity Before | Emissivity After |
| --- | --- | --- | --- |
| Example I Samples |  |  |  |
| Control | 0.19 | 0.37 | 0.37 |
| 500 Å Silica film | 0.05 | 0.37 | 0.41 |
| 1000 Å Silica film | 0.05 | 0.38 | 0.38 |
| Example II Samples |  |  |  |
| Control | 0.22 | 0.47 | 0.46 |
| 500 Å Silica film | 0.11 | 0.47 | 0.46 |
| 1000 Å Silica film | 0.14 | 0.46 | 0.47 |
| Example III Samples |  |  |  |
| Control | 0.18 | 0.43 | 0.43 |
| 500 Å Silica film | 0.09 | 0.44 | 0.44 |
| 1000 Å Silica film | 0.00 | 0.43 | 0.43 |
| Example IV Samples |  |  |  |
| Control | 0.12 | 0.51 | 0.51 |
| 500 Å Silica film | 0.06 | 0.51 | 0.52 |
| 1000 Å Silica film | 0.06 | 0.51 | 0.51 |
| Example V Samples |  |  |  |
| Control | 0.04 | 0.42 | 0.47 |
| 500 Å Silica film | 0.00 | 0.42 | 0.47 |
| 1000 Å Silica film | 0.00 | 0.42 | 0.46 |
| Example VI Samples |  |  |  |
| Control | 0.04 | 0.29 | 0.32 |
| 500 Å Silica film | 0.01 | 0.29 | 0.30 |
| 1000 Å Silica film | 0.03 | 0.29 | 0.30 |
| Example VII Samples |  |  |  |
| Control | 0.44 | 0.37 | 0.47 |
| 500 Å Silica film | 0.29 | 0.37 | 0.39 |
| 1000 Å Silica film | 0.23 | 0.37 | 0.43 |
| Example VIII Samples |  |  |  |
| Control | 0.37 | 0.36 | 0.34 |
| 500 Å Silica film | 0.19 | 0.35 | 0.35 |
| 1000 Å Silica film | 0.13 | 0.35 | 0.35 |
| Example IX Samples |  |  |  |
| Control | 0.04 | 0.36 | 0.38 |
| 500 Å Silica film | 0.02 | 0.36 | 0.38 |
| 1000 Å Silica film | 0.00 | 0.36 | 0.37 |
| Example X Samples |  |  |  |
| Control | 0.17 | 0.36 | 0.37 |
| 500 Å Silica film | 0.08 | 0.37 | 0.38 |
| 1000 Å Silica film | 0.00 | 0.35 | 0.38 |

With reference to Table 2, the practice of the invention in all instances reduced surface haze without appreciably affecting emissivity.

Although the invention was discussed to smooth the rough surface to reduce haze, smoothing the rough surface in accordance to the invention also minimizes foreign particles e.g. packing materials from being embedded in the rough surface.

As can now be appreciated, the above Examples and discussions are for purposes of describing the invention and are not intended to limit the invention. For example, a silica film having a thickness between 100 and 2,000 Angstroms may be used in the practice of the invention. Further, reference has been made to the index of refraction at the interface; however, if the index of refraction of the layer having the rough surface or the substrate having the rough surface has a uniform index of refraction throughout its thickness, reference to the rough surface includes the layer and/or substrate.

What is claimed is:

1. An article having reduced surface haze comprising:
   a substrate having a coating layer over a major surface of the substrate, the coating layer having a major surface facing away from the substrate defined as a first major surface and an opposite major surface facing the substrate, the first major surface having valleys and peaks wherein light beams incident on the first major surface are reflected from the first major surface as first surface reflected light beams whereby the first major surface of the coating layer has a level of surface haze, and
   a haze reducing film deposited on the first major surface of the coating layer wherein the haze reducing film is a crystalline coating film deposited by a technique selected from the group consisting of pyrolytic coating and sputter coating, the haze reducing film while being deposited on the first major surface contacts the first major surface filling in the valleys of the first major surface, the film as deposited has a major surface facing away from the first major surface of the coating layer defined as a second major surface, the second major surface having valleys and peaks with the distance between the valleys and peaks of the second major surface being less than the distance between the valleys and peaks of the surface of the first major surface wherein the light beams incident on the second major surface are reflected from the second major surface as second surface reflected light beams wherein the second surface reflected light beams are less diffused than the first surface reflected light beams such that the level of surface haze of the second major surface is less than the level of surface haze of the first major surface to provide the article having reduced surface haze.

2. The article according to claim 1 wherein the substrate is a glass piece and the light beams incident on the first major surface pass through the substrate and exit as first surface transmitted light beams and the light beams incident on the second major surface pass through the article as second surface transmitted light beams wherein the second surface transmitted light beams are less diffuse than the first surface transmitted light beams.

3. The article according to claim 1 wherein the haze reducing film has a thickness of about 1 to 3 times the distance between the average depth of the valleys and the average height of the peaks of the first major surface.

4. The article according to claim 1 wherein the haze reducing film has a thickness of about 3 to 10 times the distance between the average depth of the valleys and the average height of the peaks of the first major surface.

5. The article according to claim 1 wherein the coating layer is a polycrystalline coating layer.

6. The article according to claim 1 wherein the coating layer is a crystalline coating layer.

7. The article according to claim 2 wherein the coating layer is a tin oxide coating.

8. The article according to claim 1 wherein index of refraction of the haze reducing film is approximately equal to the index of refraction of the coating layer.

9. An article having reduced surface haze comprising:

a substrate having a coating layer over a major surface of the substrate, the coating layer having a major surface facing away from the substrate defined as a first major surface and an opposite major surface facing the substrate, the first major surface having valleys and peaks wherein light beams incident on the first major surface are reflected from the first major surface as first surface reflected light beams whereby the first major surface of the coating layer has a level of surface haze, and a haze reducing film deposited on the first major surface of the coating layer by a technique selected from the group consisting of pyrolytic coating and sputter coating wherein index of refraction of the haze reducing film is different than the index of refraction of the coating layer, the haze reducing film while being deposited on the first major surface contacts the first major surface filling in the valleys of the first major surface, the film as deposited has a major surface facing away from the first major surface of the coating layer defined as a second major surface, the second major surface having valleys and peaks with the distance between the valleys and peaks of the second major surface being less than the distance between the valleys and peaks of the surface of the first major surface wherein the light beams incident on the second major surface are reflected from the second major surface as second surface reflected light beams wherein the second surface reflected light beams are less diffused than the first surface reflected light beams such that the level of surface haze of the second major surface is less than the level of surface haze of the first major surface to provide the article having reduced surface haze.

10. The article according to claim 9 wherein the haze reducing film is a silica film.

11. The article according to claim 10 wherein the coating layer is tin oxide.

12. The article according to claim 11 wherein the tin oxide layer is a fluorine doped tin oxide layer.

13. The article according to claim 12 wherein the coating layer has a thickness between 500 to 10,000 Angstroms.

14. The article according to claim 12 wherein the tin oxide is pyrolytically deposited and the distance between the average depth of the valleys and the average height of the peaks is equal to about 5 to 25 percent of the tin oxide layer thickness.

15. The article according to claim 14 wherein the thickness of the tin oxide coating layer is in the range of about 1,000 to 5,000 Angstroms.

16. The coated article according to claim 10 wherein the thickness of the silica film is in the range of about 100 to 2000 Angstroms.

17. The coated article according to claim 2 wherein the haze reducing film is a mixed oxide.

18. The coated article according to claim 17 wherein the mixed oxide is tin oxide and silicon oxide.

19. The article according to claim 1 wherein the value of emissivity of the substrate is similar to value of the emissivity of the article.

20. The article according to claim 1 wherein the coating layer includes a film of silica on the substrate and a film of tin oxide on the film of silica.

21. The article according to claim 9 wherein the haze reducing film is a crystalline layer.

* * * * *